US00RE45486E

(19) United States
(12) Reissued Patent
Ahvenainen et al.

(10) Patent Number: US RE45,486 E
(45) Date of Reissued Patent: Apr. 21, 2015

(54) METHOD FOR ADDRESSING A MEMORY CARD, A SYSTEM USING A MEMORY CARD, AND A MEMORY CARD

(71) Applicant: Memory Technologies LLC, Las Vegas, NV (US)

(72) Inventors: Marko Ahvenainen, Ruutana (FI); Kimmo Mylly, Julkujärvi (FI)

(73) Assignee: Memory Technologies LLC, Las Vegas, NV (US)

(21) Appl. No.: 13/902,258

(22) Filed: May 24, 2013

Related U.S. Patent Documents

Reissue of:
(64) Patent No.: 7,257,669
Issued: Aug. 14, 2007
Appl. No.: 10/770,852
Filed: Feb. 2, 2004

(30) Foreign Application Priority Data

Feb. 7, 2003 (FI) ..... 20030191

(51) Int. Cl.
*G06F 12/06* (2006.01)
*G06F 13/38* (2006.01)
*G06F 12/02* (2006.01)

(52) U.S. Cl.
CPC ..... *G06F 12/0615* (2013.01); *G06F 13/385* (2013.01); *G06F 12/0646* (2013.01); *G06F 12/0246* (2013.01); *G06F 12/0623* (2013.01)

(58) Field of Classification Search
CPC . G06F 13/385; G06F 13/387; G06F 12/0623; G06F 12/0615; G06F 12/0646
USPC ..... 711/170, 212, E12.081, 115
See application file for complete search history.

(56) References Cited

U.S. PATENT DOCUMENTS 4,979,144 A 12/1990 Mizuta
4,982,378 A 1/1991 Matsushita
5,119,486 A 6/1992 Albonesi (Continued)

FOREIGN PATENT DOCUMENTS

WO WO 00/49488 8/2000
WO WO 00/49488 A1 8/2000

(Continued)

OTHER PUBLICATIONS

Intel PXA27x Processor Family Developer's Manual, Section 6.4.2.3, "SDRAM Memory Size Options," pp. 6-8 to 6-19.*

(Continued)

*Primary Examiner* — Pierre-Michel Bataille
(74) *Attorney, Agent, or Firm* — Sterne, Kessler, Goldstein & Fox P.L.L.C.

(57) ABSTRACT

The present invention relates to a method for addressing the memory locations of a memory card. There are several memory locations in a memory card for storing data, in which case in order to address a specific memory location an address is formed. At least one parameter is stored in the memory card, on the basis of which parameter the number of memory locations of a memory card can be calculated, and a specific number of bits is reserved for said at least one parameter. In the method, two or more memory locations are addressed with one address, and/or the number of bits that can be used in an address is increased. The invention also relates to a system and a memory card in which the method is applied.

29 Claims, 2 Drawing Sheets

(56) References Cited

U.S. PATENT DOCUMENTS

| | | | | |
|---|---|---|---|---|
| 5,375,222 | A | 12/1994 | Robinson et al. | |
| 5,383,147 | A | 1/1995 | Sanemitsu | |
| 5,860,157 | A | 1/1999 | Cobb | |
| 5,935,228 | A | 8/1999 | Shinomura | |
| 6,023,281 | A | 2/2000 | Grigor et al. | |
| 6,182,159 | B1 | 1/2001 | Urabe | |
| 6,282,624 | B1 | 8/2001 | Kimura et al. | |
| 6,426,893 | B1 | 7/2002 | Conley et al. | |
| 6,499,094 | B1 * | 12/2002 | Fraser et al. | 711/171 |
| 6,505,269 | B1 * | 1/2003 | Potter | 711/202 |
| 6,725,322 | B1 * | 4/2004 | Shiraishi et al. | 711/103 |
| 6,754,765 | B1 | 6/2004 | Chang et al. | |
| 6,775,169 | B1 | 8/2004 | d'Acoz et al. | |
| 6,791,557 | B2 * | 9/2004 | Champion | 345/545 |
| 6,901,457 | B1 * | 5/2005 | Toombs et al. | 710/11 |
| 2004/0225860 | A1 * | 11/2004 | Ahvenainen et al. | 711/212 |
| 2005/0204092 | A1 * | 9/2005 | Masuyama et al. | 711/103 |

FOREIGN PATENT DOCUMENTS

| | | |
|---|---|---|
| WO | WO 02/49039 | 6/2002 |
| WO | WO 02/49039 A2 | 6/2002 |

OTHER PUBLICATIONS

SanDisk, *SanDisk Industrial Grade ATA—CompactFlash, PC Card, and FlashDrive—Product Manual Version 2.3*, http://content.abt.com/documents/4764/ProdManualIndustrialGradeATAv2.3.pdf, Published Oct. 2003; pp. 1-101.

Texas Instruments, *CompactFlash Memory Card Interface to the TMS320VC54x*, Application Report SPRA803, www.ti.com/lit/pdf/spra803, Published Nov. 2001; pp. 1-34.

Hitachi, *Hitachi Releases High-Speed MultiMediaCardTM Series Achieving Industry's Top-Level Write Speeds*, http://www.hitachi.com/New/cnews/E/2001/0910/, Published Sep. 10, 2001, 1 page.

Hitachi, *Hitachi MultiMediaCard 1,2 products are first in the industry to pass the MultiMediaCard Association's compliance tests for system spedification version 3.1*, http://www.hitachi.com/New/cnews/E/2002/0806/ , Published Aug. 6, 2002, 1 page.

Nelson Chan, *World's Smallest Solid State Storage Device Sets New Industry Standard*, IEEE, 1997; 3 pages.

Tom Mahon, *MultiMediaCard Specifications Version 4.0 As Released*, Feb. 2, 2004; 67 pages.

Non-Final Rejection mailed Oct. 6, 2006 for U.S. Appl. No. 10/770,852, filed Feb. 2, 2004; 10 pages.

Notice of Allowance mailed May 4, 2007 for U.S. Appl. No. 10/770,852, filed Feb. 2, 2004; 4 pages.

International Search Report directed to related International Patent Application No. PCT/FI2004/050007, mailed May 19, 2004; 2 pages.

Written Opinion of the International Search Authority directed to related International Patent Application No. PCT/FI2004/050007, mailed May 19, 2004; 4 pages.

European Search Report directed to related European Patent Application No. 04 706 201.3-2212, mailed Aug. 5, 2011; 6 pages.

European Search Report directed to related European Patent Application No. 04 706 201.3-2212, mailed Mar. 6, 2012; 4 pages.

HITACHI: Hitachi releases high-speed MultiMediaCard series achieving industry's top-level write speeds, Sep. 10, 2001 http://proquest.umi.com/pqdweb?did=80087214&Fmt=clientId=19649&RQT=309&VName=PQD.*

HITACHI: Hitachi's MultiMediaCard 1,2 products are first in the industry to pass the MultiMediaCard Association's compliance tests for system specification version 3.1, Aug. 6, 2002, http://proquest.umi.com/pqdweb?did=146413271&Fmt=3&clientId=19649&RQT=309&VName=PQD.*

* cited by examiner

METHOD FOR ADDRESSING A MEMORY CARD, A SYSTEM USING A MEMORY CARD, AND A MEMORY CARD

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATIONS

This application claims priority under 35 USC § 119 to Finnish Patent Application No. 20030191 filed on Feb. 7, 2003*, which issued as Finnish Patent No. 117489 on Oct. 31, 2006*.

FIELD OF THE INVENTION

The present invention relates to a method for addressing a memory card, in which memory card there are several memory locations for storing data, in which case an address is formed in order to address a specific memory location, so that at least one parameter is stored in the memory card, on the basis of this parameter the number of memory locations in the memory card can be calculated, and a specific number of bits is reserved for said at least one parameter. In addition, the present invention relates to a system, which comprises a memory card where there are several memory locations for storing data, and in which memory card is stored at least one parameter, on the basis of which the number of memory locations in the memory card can be calculated, and a specific number of bits is reserved for said at least one parameter, and which system in addition comprises an address generator for addressing the memory locations of a memory card. The invention also relates to a device, which comprises a card connection for connecting a memory card to the device, which memory card comprises several memory locations for storing data, and in which memory card is stored at least one parameter, on the basis of which the number of memory locations in the memory card can be calculated, and a specific number of bits is reserved for said at least one parameter, and which device in addition comprises an address generator for addressing the memory locations of a memory card. In addition, the invention relates to a memory card, which comprises several memory locations for storing data, and at least one parameter is stored in the memory card, on the basis of this parameter the number of memory locations in the memory card can be calculated, and a specific number of bits is reserved for said at least one parameter.

BACKGROUND OF THE INVENTION

Memory cards have been developed, which can be connected to different electronic devices for storing data and for using the stored data. Memory cards of this type typically comprise a semiconductor memory, where there are several memory locations that can be addressed. Each memory location typically comprises a specific number of bits, such as 8 bits (a byte), 16 bits (a word), 32 bits (a double-word), or even 64 bits. Thus the amount of data that can be addressed with one piece of address data is the amount of bits in the memory location in question.

Memory cards are known, where data can be transferred between the memory card and an external device block by block, i.e. as assemblies of several memory locations. The size of this type of a block is e.g. 512 or 1024 bytes, or the size of the block can be selected between minimum and maximum values, e.g. 1 to 2048 bytes/block. Thus, the device to which the memory card is connected performs the transfer of data between the device and the memory card block by block. On the basis of the address of the memory location, it is determined in the memory card which block the byte (or bytes) being handled are located in. After this, the transfer of the block in question is performed.

It is also possible to use another memory besides the semiconductor memory with the memory cards. For example, fixed disks can nowadays be manufactured in such a small size that they can be placed in a memory card.

In the planning phase of memory cards, the rapid development of memory technology has not been previously prepared for, in which case in some memory card standards an upper limit has been set for the number of memory locations included in a memory card. Since the development of semiconductor memories and other memory techniques as well has made it possible to substantially reduce the area required for storing one bit, the amount of memory that can be fitted into a memory card is nowadays already larger than the upper limit determined by many standards. An example of this type of a memory card standard is MultiMediaCard, where the upper limit is set as 4 gigabytes. Therefore, a problem may arise of, e.g. how the memory space of the entire memory card can be handled. For example, in order to address the memory locations of a memory card according to the specifications of said MultiMediaCard, there are 32 bits that can be used, with which a maximum of 4 gigabytes of memory space can be addressed. The memory locations exceeding this limit cannot be addressed with a memory card according to the MultiMediaCard specifications when using the solutions according to the prior art.

The maximum memory capacity of the memory card according to the MultiMediaCard specifications is especially limited by the fact that data on the memory capacity of the memory card is coded in the memory card. The memory capacity is calculated by multiplying the number of blocks with the length of the block. The number of blocks (BLOCKNR) can be determined by reading the parameters C_SIZE and C_SIZE_MULT stored in the memory, as well as by performing the calculation:

$$\text{BLOCKNR}=(\text{C_SIZE}+1)*2^{\text{C_SIZE_MULT}+2} \quad (1)$$

Correspondingly, the length of the block (BLOCK_LEN) is determined by means of the parameter READ_BL_LEN in the following way:

$$\text{BLOCK_LEN}=2^{\text{READ_BL_LEN}} \quad (2)$$

According to the present specification, 12 bits are reserved for the parameter C_SIZE, in which case the maximum value is 4095. Three bits are reserved for the parameter C_SIZE_MULT, while the maximum value is thus 7. Four bits are reserved for the parameter READ_BL_LEN, and therefore the maximum value is 16. However, from the 4-bit values of the parameter READ_BL_LEN, only the values 0 to 11 are in use. On the basis of the above, the maximum capacity that can be calculated by means of the parameters is $$((4095+1)*(2^{(7+2)}))*(2^{11})=4096*512*2048=4294967296$$

bytes i.e. 4 gigabytes (4 GB).

SUMMARY OF THE INVENTION

It is an aim of the present invention to provide an improved addressing method for addressing the memory locations of a memory card. The invention is based on the idea that either the size of a data area addressed with one memory address is changed into the multiple of one memory location, in which case more memory locations can be addressed with the address space available for use, or the address space is increased by increasing the number of bits to be used in an address. In addition, the meaning of at least one parameter is changed, in which case the coding of the memory card can be used in the calculated indication of the expanded memory capacity. To put it more precisely, the method according to the present invention is primarily characterized in that two or more memory locations are addressed with one address, and/or the number of bits that can be used in an address is increased. The system according to the present invention is primarily characterized in that two or more memory locations are arranged to be addressed with one memory address, and/or the number of bits that can be used in an address is increased. The device according to the present invention is primarily characterized in that two or more memory locations are arranged to be addressed with one address, and/or the number of bits that can be used in an address is increased. The memory according to the present invention is primarily characterized in that two or more memory locations are arranged to be addressed with one memory address, and/or the number of bits that can be used in an address is increased.

The present invention shows remarkable advantages over solutions of prior art. By applying the invention, it is possible to create memory cards, where the memory capacity is significantly larger than in memory cards according to prior art. However, in the system according to the invention, it is still possible to retain compatibility with previous systems, in which case the memory cards according to the invention can be used in previous systems as memory cards according to prior art. In addition, with the invention is reached the advantage that the implementation of the driver of the file system in a device to which the memory card can be connected is easier when using a block-based addressing manner and when using the block size used in the file system, such as blocks of 512 bytes. The total power consumption can be reduced in the device according to the invention. The calculation needed for coding the address can also be reduced in the device according to the invention.

BRIEF DESCRIPTION OF THE DRAWINGS

In the following, the present invention will be described in more detail with reference to the appended drawings, in which.

DETAILED DESCRIPTION OF THE INVENTION

Figure 1:
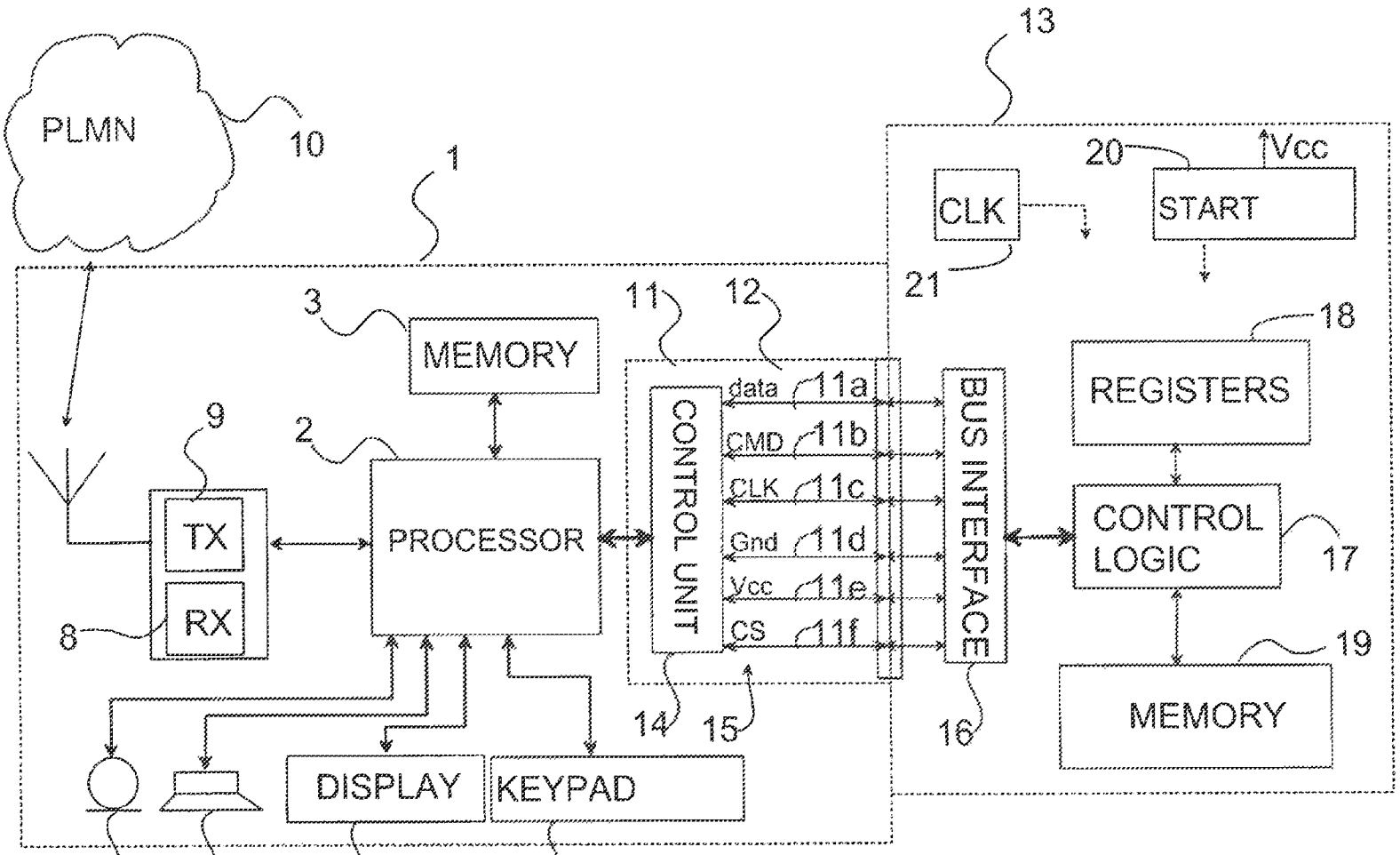
FIG. 1 shows a system according to an advantageous embodiment of the invention in a reduced block chart.

In the following description of an advantageous embodiment of the invention, the device 1 will be exemplified with a wireless terminal, such as a mobile communication device, but it will be obvious that the invention is not limited to be used in such devices only. The device 1 comprises a processor 2, and a memory 3, which may also comprise several different memory blocks, such as a read only memory (ROM) and a random access memory (RAM). Furthermore, a part of the memory can be a non-volatile memory, such as an *electrically erasable programmable read-only memory* (EEPROM) [memory], in a way known as such. Also, the device preferably comprises a display 4, a keypad 5, and audio means, such as an earpiece and/or a speaker 6 and a microphone 7. Advantageously, the device 1 also comprises communication means, such as a transmitter 9 and a receiver 8, for data transfer between the device 1 and a communication network 10. These communication means 8, 9 are preferably intended for wireless communication, in which case the communication network 10 comprises a wireless communication network, such as a mobile communication network, a wireless local area network, or the like. Furthermore, the device comprises an interface 11 provided with, for example, a card connection 12 for connecting a card, such as a memory card 13, to the device 1, as well as a card control unit 14 and a data transfer bus 15 for the transfer of commands and data between the device 1 and the card 13. The interface 11 may also comprise more than one bus, in which case also more than one card may be connected to the interface 11 at a time.

In various applications, the memory card 13 to be connected to the device 1 may be very different, and the present invention is not limited to any specific memory card. The memory card according to MultiMediaCard specifications can be mentioned as a non-limiting example of such a memory card 13. When using the various memory card types, the device interface 11 may vary, but a person skilled in the art will be able to apply the invention in also other interfaces on the basis of the following example application. In the system according to an advantageous embodiment of the invention, shown in FIG. 1, the memory card 13 is a memory card complying with the MultiMediaCard specifications, and the data transfer between the memory card 13 and the card control unit 14 of the device 1 is performed in a serial format according to the MultiMediaCard specifications. In this case, the interface 11 is preferably provided with at least a serial data line 11a, a command line 11b, a clock line 11c, one or more ground lines 11d (Gnd) set to the zero potential, and one or more operating voltage lines 11e (Vcc). In addition, the interface 11 may comprise a chip select line 11f (CS).

FIG. 1 also shows the internal structure of one such memory card 13 in a reduced block chart. The memory card 13 comprises a bus connection block 16, via which the lines of the data transfer bus 15 are connected to the memory card 13, control logistics 17 for controlling the functions of the memory card 13, and a start block 20, by means of which the memory card 13 can be started in a controlled manner, for example, when the operating voltages are switched on the memory card, and also under the control of the device 1, if necessary. Preferably, the memory card 13 also comprises internal registers 18 for storing some data. The memory card 13 is also provided with a memory 19, which can be a read only memory and/or a random access memory. The memory 19 may comprise one or more memory types, such as a dynamic *random access* memory (DRAM), a static *random access* memory (SRAM), or a non-volatile memory (EEPROM, Flash). The memory 19 may also be implemented entirely or partly as a magnetic and/or optic memory, of which non-restrictive examples include a fixed disk, a *compact disc read-only memory* (CD-ROM), and a *digital versatile disk* (DVD).

Furthermore, the memory card 13 preferably comprises a clock circuit 21 for generating clock signals required in the operation of the different functional blocks of the memory card 13 in a way known as such.

In this advantageous embodiment of the invention, the functions of the card are preferably controlled in the following way. When the device 1 is started and the memory card 13 is connected to the card connection 12, so-called configuration functions are performed in the memory card 13 in a way known as such, to set the memory card in a given mode. These configuration functions may also be started under the control of the device 1. After the memory card 13 has been started and set, for example, in the normal mode, it is possible to start data transfer between the memory card 13 and the device 1. For the data transfer, the card control unit 14 transmits the clock signal via the clock line 11c to the memory card 13. In the memory card 13, this clock signal is used for reading data from the data line 11a. Of the information to be transmitted to the memory card, the card control unit 14 sets the mode of one bit at a time to the data line 11a, in which case the memory card 13 reads the mode of the data line 11a preferably in connection with a mode change of the clock line 11c in a given direction, for example when the mode of the clock line 11c is changed from the 0 mode to the 1 mode. The data of the next bit is set to the data line after the above-mentioned change of mode of the clock line 11c, in which case the next bit can be read when the mode of the clock line 11c is changed for the next time in the corresponding direction. It is obvious that the reading can also be performed for each mode change, in which case the new data is always set in the data line before the next mode change.

After the transfer of the required number of bits (e.g. 8, 16, 32, 48 or 64 bits), the received data is processed in the memory card 13. This may involve, for example, a command word, such as a command to reset the function of the memory card, the writing of data in the memory 19 of the memory card 13, the reading of data from the memory 19 of the memory card, or the setting of the mode of the memory card. Because the present invention relates to the addressing of the memory locations of the memory card 13, for example, for writing and/or storing data, the following description will primarily focus on the commands and other corresponding functions relating to the addressing of the memory locations.

Figure 2:
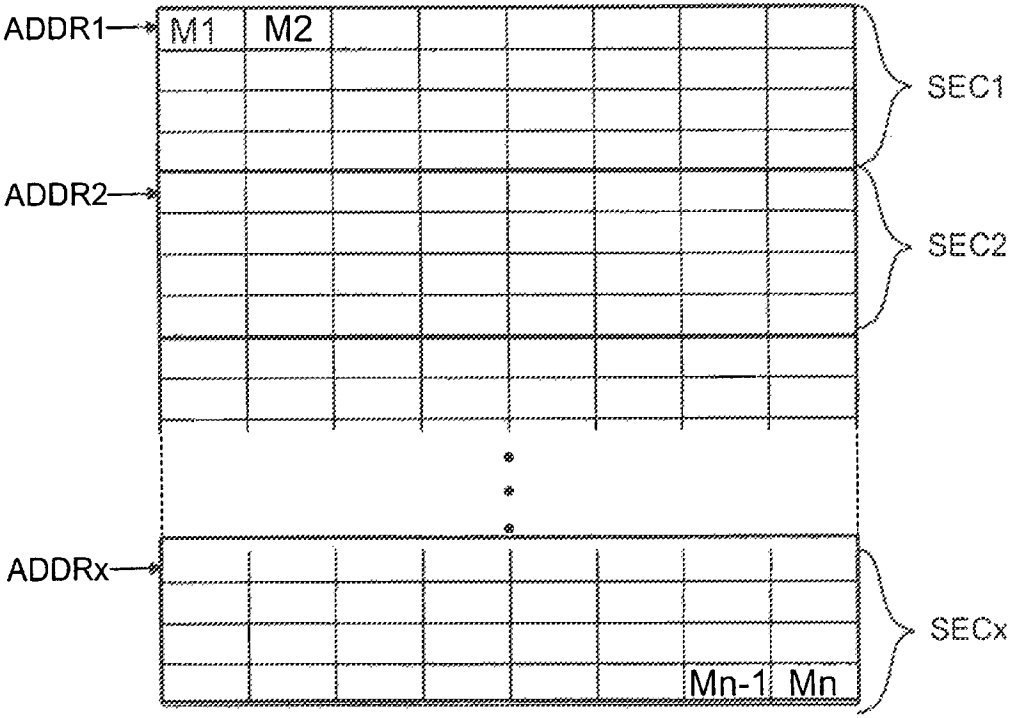
FIG. 2 shows an addressing method according to an advantageous embodiment of the invention in a reduced manner.

In the following, the memory card 13 according to a first advantageous embodiment of invention will be described by using the memory card according to the MultiMediaCard specifications with reference to FIG. 2. In this embodiment the memory locations of the memory card 13 are handled in a so called sector-by-sector manner, in which case with one address ADDR1 it is possible to address to the data of one sector SEC, with the next address ADDR2 to the data of the next sector SEC2, etc. Thus, with one reading address the data of the memory locations M1, M2, . . . , Mn of one sector is read. Correspondingly, with one writing address the storage of the data to the memory locations M1, M2, . . . , Mn of one sector is performed. The size of the sector may vary in different situations. Data on that the memory card 13 functions in a sector-based manner is stored in the memory card 13. This addressing data is stored preferably in one bit, as which is used, for example, a bit not in use by the CSD register. This type of a bit is, for example, bit 17 in the memory cards following the MultiMediaCard specifications according to prior art. This value of the addressing data is stored in the memory card 13 advantageously in the manufacturing phase of the memory card. It should be mentioned here that the size of the sector is not necessarily the same as the size of the block, but it can be smaller or larger than the size of the block. Block here refers to that number of memory locations that are to be transferred by means of one memory reading or writing operation between the memory and the device handling the memory, as is presented previously in this description.

The size of the sector of the memory card is stored in the registers of the memory card as well. For this purpose in the MultiMediaCard memory cards, it is possible to use the register READ_BL_LEN indicating the block size. Previously this register has indicated how large blocks the data can be transferred in between the memory card 13 and the device 1. Now the significance is substantially the same with the difference that one address data addresses to an entire sector, while in the memory card according to prior art an address data addresses to an individual memory location. In the address it is possible to use as many bits as there are in the cards according to prior art, e.g. 32 bits.

In connection with formatting the memory card 13, the device 1 reads the values of certain registers in order for the device 1 to determine the memory capacity and other properties of the memory card 13. Thus, in the device 1, for example, the processor 2 calculates the memory capacity, for example, by means of formulas (1) and (2). It is, however, to be noted that the significance of the parameters of the formulas has in this embodiment been changed, because otherwise in the calculation of the maximum capacity, the upper limit would be 4 gigabytes, as was already mentioned earlier in this description. In order to solve this, in this invention the significance of the parameter C-SIZE has been changed so that it signifies kilobytes instead of bytes. Thus, for example, the value 4095 of the parameter C_SIZE signifies 4095 kilobytes, if the addressing data indicates that it is a memory card expanded according to the invention. Thus, the maximum memory capacity (MC) calculated by means of the formula is as follows:

$$MC=((4095+1k)*(2^{(7+2)}))*(2^{11})= 4096k*512*2048=4398046511104$$

bytes, i.e. 4 terabytes (4 TB).

The above result has been reached with that precondition, that of the values of the 4-bit parameter READ_BL_LEN indicating the size of the block only the values 0 to 11 are in use. If in this embodiment the parameters 12 to 15 are taken into use, the maximum capacity can be further increased, but it is likely that 4 terabytes is enough in practical memory card applications.

After the properties of the memory card 13 have been determined, it is possible to move on to the memory card 13 processing, if necessary. The memory card 13 can be a part of the memory space of the device 1, or it can be located in a separate memory area. If the memory card 13 is in the memory space of the device 1, a specific address space is reserved for the memory card 13. Thus, in a situation where there is a need for the device 1 either to read data from the memory card 13 or to write information to it, the operation in the method according to the first advantageous embodiment of the invention is advantageously as follows. In the device 1 the processor 2 advantageously sets the command according to the memory operation to be performed for the command line 11b, for example a read command. In this example the command is transmitted in a serial form, in which case the card control unit 14 performs the transmission of the command in a serial form to the memory card 13. The command that has arrived is interpreted at the memory card 13, in connection with which it has been possible to also send the address data, for example, as an argument of the command. If the address data is not transmitted in connection with the command, the memory card 13 will wait for the address data, which is thus to be transmitted from the device after the command. The processor 2 and the card controller 14 determines which address is to be transmitted to the card. Let us, for example, assume that the memory card 13 is in the address space of the device 1 beginning from a specific basic address, which is marked here with the symbol Al. The end of the memory area reserved for the memory card 13 is thus the basic address added with the memory capacity of the memory card 13, i.e. Al+MC. When, for example, in the program being performed in the processor 2 is addressed to the memory area reserved for the memory card, the basic address is subtracted from this address, after which the difference is further divided by the size of the sector READ_BL_LEN. This numerical value is the address that is transmitted to the memory card 13 from the card control unit 14. The quotient of the division, for its part, indicates the location of the desired data in the sector in question. The quotient is, however, not transmitted to the memory card 13. After the address is transmitted to the memory card, the reading or writing of data is performed. In a reading situation, the sending of data is started from the memory card 13 via data line 11a sector by sector. The card control unit 14 reads the data of one sector and stores them, for example, in a buffer memory (not shown). The buffer memory can be formed, for example, in the memory 3 of the device in a way known as such. The processor 2 can read the desired data from the buffer. Thus, the above-mentioned quotient indicates at which point of the buffer the desired data (or starting point of data) is located. If there is a need to handle data from several sectors, the reading of data from the memory card 13 can be continued by increasing the address by one after the processing of one sector. Ending the data reading is thus performed advantageously with a stop command or the like.

Correspondingly, when writing data on a memory card 13, the operation is as follows. The basic address is subtracted from the storage address, after which the difference is divided by the sector size READ_BL_LEN, which provides the address of that sector to which the data on the memory card 13 is to be stored. The data of the sector in question is read from the memory card 13 in device 1, for example, to the buffer memory, if they are not already read in the device 1. After this, the value of that memory location, which is supposed to be changed with the memory card 13 is set in the buffer memory to the desired value. The address of this memory location is clarified on the basis of the remainder of said division. When the data is set, the data in the buffer can be sent to the memory card 13, where they are stored. The storing address is the address of that sector where the memory location to be changed is located. Also, when writing the data it is possible to perform the storing of several sectors advantageously by increasing the address by one after the processing of one sector. Ending the data writing is thus performed advantageously with a stop command or the like.

In the solution according to a second advantageous embodiment of the invention, the increase of the memory capacity of the memory card 13 is implemented in the following way. In the parameters READ_BL_LEN, on the basis of which the length of the block BLOCK_LEN used in the memory card can be calculated, also the values that are greater than 11 are taken into use, i.e. the values 12 to 15. With this arrangement, the calculated maximum memory capacity is as follows:

$$MC=((4095+1)*(2^{(7+2)}))*(215)=4096*512*32768=68719467636$$

bytes, i.e. 64 gigabytes (64 GB).

The problem is, however, that with a 32-bit address it is not possible to address such a large memory area, but 4 gigabytes at the most. This is solved in this advantageous embodiment in such a manner that with the values of the parameter READ_ BL_LEN, which are larger than 11, the smallest addressable unit is the multiple of one memory location. This can depend on the value of the parameter READ_BL_LEN, for example, according to the following table 1.

TABLE 1

| READ _BL_LEN | The smallest addressable unit |
|---|---|
| 0-11 | 1 byte |
| 12 | 2 bytes |
| 13 | 4 bytes |
| 14 | 8 bytes |
| 15 | 16 bytes |

This second advantageous embodiment of the invention can be applied also in such a manner that the smallest addressable unit is the same for all values that are larger than 11. Thus the size of the smallest addressable unit is preferably 16 bytes.

When using the memory card 13 according to the second embodiment of the invention, the device 1 determines the memory capacity of the memory card 13 and the length of the block on the basis of the parameters. In addition, the parameter READ_BL_LEN is used to determine what is the smallest addressable unit. If the value of the parameter READ_ BL_LEN is smaller than 12, the memory card 13 can be used in the manner of the memory cards according to prior art. If, however, the value of the parameters READ_BL_LEN is 12 or greater, it is to be noted that one memory address indicates more than one memory location, in which case the principles presented in connection with the description of the operation of the first advantageous embodiment are to be applied in processing the memory locations. In this situation, the size of the smallest addressable unit in a way corresponds to the concept of sector size, i.e. the size of the sector is one of the values according to the table 1, or constant (preferably 16 bytes).

Also, in the solution according to a third advantageous embodiment of the invention the increase of the memory capacity of the memory card 13 is implemented in such a manner that also the values that are greater than 11 are taken into use in the parameter READ_BL_LEN, i.e. the values 12 to 15. In addition to this, the number of address bits is increased. This is implemented preferably by doubling the number of address bits from, for example, 32 bits to 64 bits. Thus, the maximum memory capacity is determined from the limitations set by calculating formulas (1) and (2), assuming that the significance of other parameters remains as present. The advantage that each individual memory location can be addressed is reached with this solution.

The value of the parameter READ_BL_LEN is used in calculating the maximum memory capacity and in determining the size of the block, for example according to the following table 2.

TABLE 2

| READ_BL_LEN | The value used in calculating the maximum memory capacity | Length of the block |
|---|---|---|
| 9 | 512 | 512 bytes |
| 10 | 1024 | 1024 bytes |
| 11 | 2048 | 2048 bytes |
| 12 | 4096 | 2048/4096 bytes |
| 13 | 8192 | 2048/4096/8192 bytes |
| 14 | 16384 | 2048/4096/8192/16384 bytes |
| 15 | 32768 | 2048/4096/8192/16384/32768 bytes |

In table 2, several alternative values are marked in the block length column for the values 12 to 15 of the parameter. Thus, it is possible to application-specifically select which block length is used for each parameter value.

The increase of the number of address bits can be implemented by several alternative means. One alternative is that a special command is specified, which indicates to the memory card 13 that it is an expanded address. Thus, the device 1 sends this special command to the memory card, in which case the memory card 13 knows to expect several address bytes, which the device 1 sends. This type of a special command can be implemented in the present command register CSD or in the expanded command register EXT_CSD, which is being developed. Another possibility is to use a so-called switch command, which is also being developed for Multi-MediaCard specifications. The parameter of the switch command thus indicates which command is in question at a certain time.

Further, with the arrangement according to the present invention is reached the advantage that the memory cards 13 according to the invention are downwards compatible with the memory cards according to prior art. Thus, when connecting the memory card according to the invention to a device where the changes required for using the memory card according to the invention have not been implemented, the memory cards function, from the point of view of the device, as memory cards according to prior art. Thus, however, a part of the memory capacity of the memory cards remains unutilized. Let us illustrate this further with an example. Let us assume that the memory card is a memory card according to the first advantageous embodiment of the invention, where an entire sector can be addressed with one address. However, the device assumes that each address addresses one memory location, even though the data transfer as such would take place as larger assemblies. Thus, each data (byte) is stored in the memory card in the first memory location of the sector. The next data is stored in the first memory location of the next sector, etc.

In yet another advantageous embodiment of the invention, the operation is such that the memory card 13 is in a start situation in a so-called basic addressing form (minimum addressing form), i.e. the expanded addressing method according to the invention is not in use. Thus, the device 1 attempts to read the mode of, for example, some specific register (e.g. CSD register) when formatting the memory card. If the reading of the register is not successful, or the mode data indicates that the memory card does not support an expanded addressing method, the memory card is assumed to function in the basic addressing form in the manner of the memory cards according to prior art. If, however, reading the above-mentioned register is successful and the mode data indicates that the memory card supports the expanded addressing method, the memory card can be set to function according to the expanded addressing method according to this invention. With this kind of arrangement it is possible to increase compatibility for using the memory cards according to prior art and memory cards 13 according to the present invention in the device 1.

The expanded addressing according to the invention can be implemented with a program, in which case no apparatus changes are required in the device 1. Also, the inner logic of the memory card 13 remains in its present form, because the expansions of the address can be arranged in the control logic of the memory card. Apparatus changes may be required only in the internal addressing of the memory of the memory card, mainly for increasing the bit number of the addresses (column and/or line addresses).

It will be obvious that the present invention is not limited solely to the above-presented embodiments but it can be modified within the scope of the appended claims.

Having described the invention, what is claimed is:

1. A system comprising:

a memory card having several memory locations for storing data, and in which memory card is stored at least one parameter, the system configured so that the number of memory locations of the memory card can be calculated on the basis of said at least one parameter, the system configured so that a specific number of bits is reserved for said at least one parameter in the memory card, and the system further configured to use an addressing data stored in the memory card, said addressing data being indicative of at least one addressing method supported,

*wherein the addressing data indicates either a basic addressing method or an expanded addressing method, and*

*wherein the expanded addressing method enables the addressing of data in a larger number of memory locations than the basic addressing method.*

[2. The system according to claim 1, comprising at least one of the following:

addressing two or more memory locations with one address;

increasing the number of bits that can be used in an address.]

3. The system according to claim 1, comprising a device to which the memory card is connected, that the device comprises an interface provided with a card connection for connecting the memory card to the device, as well as a card control unit and a data transmission bus for transferring commands and data between the device and the memory card.

4. A device which comprises a card connection for connecting a memory card to the device, in which memory card there are several memory locations for storing data, and in which memory card is stored at least one parameter, the *memory* card configured so that the number of memory locations of the memory card can be calculated on the basis of said at least one parameter, the *memory* card configured so that a specific number of bits is reserved for said at least one parameter, and the device further comprising an address generator for addressing the memory locations of the memory card, said address generator being configured to use an addressing data stored in the memory card, said addressing data being indicative of at least one addressing method supported,

*wherein the addressing data indicates either a basic addressing method or an expanded addressing method, and*

*wherein the expanded addressing method enables the addressing of data in a larger number of memory locations than the basic addressing method.*

5. The device according to claim 4, comprising means for performing mobile communication functions.

6. A memory card comprising:

several memory locations for storing data, and in which memory card is stored at least one parameter, the *memory* card configured so that the number of memory locations of the memory card can be calculated on the basis of said at least one parameter, the *memory* card configured so that a specific number of bits is reserved for said at least one parameter, and the *memory* card further configured to have stored therein an addressing data, said addressing data being indicative of at least one addressing method supported,

*wherein the addressing data indicates either a basic addressing method or an expanded addressing method, and*

*wherein the expanded addressing method enables the addressing of data in a larger number of memory locations than the basic addressing method.*

[7. The memory card according to claim 6, comprising at least one of the following:

addressing two or more memory locations with one address;

increasing the number of bits that can be used in an address.]

8. The memory card according to claim 6, comprising a bus connection block for connecting the memory card to *a* device and for transferring data between the device and the memory card.

9. The memory card according to claim 6, wherein data is arranged to be stored and read in the memory card block-by-block.

10. The memory card according to claim 9, wherein the memory locations of one block are arranged to be addressed with one address.

11. The memory card according to claim 6, wherein the memory card is a memory card according to MultiMediaCard specifications.

12. A system comprising:

a memory card having several memory locations for storing data, and in which memory card is stored at least one parameter, the system having means for calculating the number of memory locations of the memory card on the basis of said at least one parameter, the system having means for receiving a specific number of bits for said at least one parameter in the memory card, and the system further having means for using an addressing data stored in the memory card, said addressing data being indicative of at least one addressing method supported,

*wherein the addressing data indicates either a basic addressing method or an expanded addressing method, and*

*wherein the expanded addressing method enables the addressing of data in a larger number of memory locations than the basic addressing method.*

13. A method for addressing the memory locations of a memory card, wherein at least some of said memory locations are for storing data, wherein in order to address a specific memory location the method comprises:

forming an address, storing at least one parameter in the memory card, calculating the number of memory locations in the memory card based on said at least one parameter, reserving a specific number of bits for said at least one parameter, and using an addressing data stored in the memory card, said addressing data being indicative of at least one addressing method supported,

*wherein the addressing data indicates either a basic addressing method or an expanded addressing method, and*

*wherein the expanded addressing method enables the addressing of data in a larger number of memory locations than the basic addressing method.*

14. The method according to claim 13, comprising at least one of the following:

addressing two or more memory locations with one address; increasing the number of bits that can be used in an address.

15. The method according to claim 13, comprising addressing two or more memory locations with one address, and storing in the memory card data on the number of memory locations to be addressed with one address.

16. The method according to claim 13, comprising storing data in the memory card and reading data from the memory card block-by-block.

17. The method according to claim 16, storing in the memory card three parameters, on the basis of which parameter the memory capacity of the memory card can be calculated, and that the first and the second parameter being indicative of the number of blocks, and the third parameter being indicative of the size of the blocks.

18. The method according to claim 17, comprising calculating the capacity of the memory card with the formula:

$$BLOCKNR*BLOCK_LEN,$$

in which $$BLOCKNR=(C_SIZE+1)*2^{C_SIZE_MULT+2}$$

$$BLOCK_LEN=2^{READ_BL_LEN.}$$

19. The method according to claim 17, wherein the length of the first parameter is 12 bits, the length of the second parameter is three bits, and the length of the third parameter is four bits, and that of the values of the third parameter all the possible values can be used in indicating the memory capacity of the memory card.

20. The method according to claim 17, wherein the unit of the first parameter (C_SIZE) is kilobyte.

21. The method according to claim 13, comprising addressing one memory location with one address, determining a maximum length for the address transmitted to the memory card, and sending the address transmitted to the memory card in at least two parts in such a manner that the length of the address is greater than said maximum length.

*22. The memory card according to claim 6, wherein the basic addressing method supports addressing only one memory location with one address.*

*23. The memory card according to claim 6, wherein the expanded addressing method supports a higher memory capacity than the basic addressing method.*

*24. The memory card according to claim 6, wherein the memory card is configured to use the basic addressing method if reading of the stored addressing data is unsuccessful.*

*25. The memory card according to claim 6, wherein the memory card is configured so that, if the addressing data indicates that the memory card supports the expanded addressing method, the memory card uses the expanded addressing method in response to a successful reading of the addressing data that indicates support of the expanded addressing method.*

*26. The memory card according to claim 6, further comprising a register for storing the addressing data.*

*27. The memory card according to claim 26, wherein the stored addressing data comprises one bit.*

*28. The memory card according to claim 6, wherein a significance of the at least one parameter according to the basic addressing method is different from a significance of the at least one parameter according to the expanded addressing method.*

*29. The memory card according to claim 6, further comprising a register for storing an indication of the number of memory locations addressed according to the expanded addressing method.*

*30. A memory card comprising:*

*several memory locations for storing data, and in which memory card is stored at least one parameter, the memory card configured so that the number of memory locations of the memory card can be calculated on the basis of said at least one parameter,*

*the memory card configured so that a specific number of bits is reserved for said at least one parameter, and*

*the memory card further configured to have stored therein an addressing data, said addressing data being indicative of at least one addressing method supported,*

*wherein the addressing data indicates either a basic addressing method or an expanded addressing method,*

*wherein the expanded addressing method enables the addressing of data in a larger number of memory locations than the basic addressing method, and*

*wherein the memory card is configured so that, if the addressing data indicates that the memory card supports the expanded addressing method, the memory card uses the expanded addressing method in response to a successful reading of the addressing data that indicates support of the expanded addressing method.*

*31. A memory card comprising:*

*several memory locations for storing data, and in which memory card is stored at least one parameter, the memory card configured so that the number of memory locations of the memory card can be calculated on the basis of said at least one parameter,*

*the memory card configured so that a specific number of bits is reserved for said at least one parameter, and*

*the memory card further configured to have stored therein an addressing data, said addressing data being indicative of at least one addressing method supported,*

*wherein the addressing data indicates either a basic addressing method or an expanded addressing method, and*

*wherein the memory card is configured so that, if the addressing data indicates that the memory card supports the expanded addressing method, the memory card uses the expanded addressing method in response to a successful reading of the addressing data that indicates support of the expanded addressing method.*

* * * * *